United States Patent [19]

Bryant et al.

[11] Patent Number: 4,684,420

[45] Date of Patent: Aug. 4, 1987

[54] POLYMER TRANSFER DECALS COMPRISING SATURATED ELASTOMERS

[75] Inventors: Lynn A. Bryant, Canton; Durward T. Roberts, Jr., Fairlawn; Joseph A. Beckman, Akron; Joseph H. Tazewell, Akron; James F. Cetnar, Akron, all of Ohio

[73] Assignee: The Firestone Tire & Rubber Company, Akron, Ohio

[21] Appl. No.: 766,228

[22] Filed: Aug. 16, 1985

[51] Int. Cl.[4] .................. B29B 17/00; B41M 3/12; B41M 5/00; B60C 13/00

[52] U.S. Cl. .................. 156/116; 152/524; 152/525; 152/DIG. 12; 156/240; 428/40; 428/41; 428/42; 428/914; 524/413; 524/505; 524/519; 524/539

[58] Field of Search ............... 524/505, 413, 539, 529; 428/40, 914, 41, 42; 156/116, 240; 152/DIG. 12, 524, 525

[56] References Cited

U.S. PATENT DOCUMENTS

| | | | |
|---|---|---|---|
| 1,552,907 | 9/1925 | Binmore | 156/230 |
| 2,154,198 | 4/1939 | Carr et al. | 428/914 |
| 2,188,866 | 1/1940 | Poschel | 428/914 |
| 2,611,153 | 9/1952 | Semegen | 427/155 |
| 2,646,379 | 7/1953 | Poschel | 156/240 |
| 3,073,371 | 1/1963 | Leeper | 152/330 |
| 3,113,902 | 12/1963 | Dismuke | 156/416 |
| 3,280,427 | 10/1966 | Smith | 18/13 |
| 3,285,314 | 11/1966 | Roberts | 152/353 |
| 3,382,120 | 5/1968 | Rudder | 156/116 |
| 3,449,201 | 6/1969 | Palmquist | 152/523 |
| 3,554,836 | 1/1971 | Steindorf | 156/240 |
| 3,607,498 | 9/1971 | Kubota | 156/116 |
| 3,616,176 | 10/1971 | Jachimowicz | 156/240 |
| 3,684,545 | 8/1972 | Worrall | 428/914 |
| 3,764,455 | 10/1973 | Lovell et al. | 161/162 |
| 3,876,454 | 4/1975 | Snell et al. | 428/377 |
| 4,019,945 | 4/1977 | Look et al. | 156/405 |
| 4,024,312 | 5/1977 | Korpman | 428/343 |
| 4,032,491 | 6/1977 | Schoenke | 524/68 |
| 4,038,256 | 7/1977 | Finelli et al. | 260/75 NH |
| 4,066,602 | 1/1978 | Pellico | 524/432 |
| 4,068,033 | 1/1978 | Meade | 428/914 |
| 4,072,645 | 2/1978 | Cogley, Jr. | 260/29.7 |
| 4,092,279 | 5/1978 | Piskoti | 524/18 |
| 4,101,482 | 7/1978 | Doss et al. | 524/447 |
| 4,111,734 | 9/1978 | Rosenfeld | 156/240 |
| 4,123,580 | 10/1978 | Franer | 428/914 |
| 4,136,699 | 1/1979 | Collins et al. | 428/40 |
| 4,170,503 | 10/1979 | Buchanan et al. | 156/116 |
| 4,195,107 | 3/1980 | Timm | 428/40 |
| 4,207,377 | 6/1980 | Kindrick | 428/404 |
| 4,237,173 | 12/1980 | Kuan | 260/37 N |
| 4,256,159 | 3/1981 | Williams | 152/353 R |
| 4,259,227 | 3/1981 | Ojakaar | 260/37 N |
| 4,263,077 | 4/1981 | Rampelberg | 156/240 |
| 4,267,096 | 5/1981 | Bussink et al. | 524/505 |
| 4,269,921 | 5/1981 | Tanaka et al. | 430/119 |
| 4,288,480 | 9/1981 | Grzywinski et al. | 428/40 |
| 4,296,008 | 10/1981 | St. Clair et al. | 524/271 |
| 4,390,646 | 6/1983 | Ferguson | 524/505 |
| 4,413,067 | 11/1983 | Tsuchiya et al. | 524/296 |
| 4,419,497 | 12/1983 | Tsuchiya et al. | 524/296 |
| 4,461,795 | 7/1984 | Ogawa | 156/116 |
| 4,610,744 | 9/1986 | Smith | 428/914 |

FOREIGN PATENT DOCUMENTS

| | | | |
|---|---|---|---|
| 5469190 | 3/1960 | Japan | 156/240 |
| 59-75808 | 4/1984 | Japan | 152/524 |
| 867225 | 5/1961 | United Kingdom | 156/240 |

*Primary Examiner*—Herbert J. Lilling
*Attorney, Agent, or Firm*—Daniel N. Hall

[57] ABSTRACT

Paint compositions suitable for forming decals which can be applied to vehicle tire sidewalls. The compositions comprise a saturated elastomer having a glass transition temperature not higher than −40 degrees C., a pigment which is preferably titanium dioxide in an amount in the range of 0.5 to 10 times the weight of elastomer, and a solvent. Compositions of this invention are resistant to ultraviolet light and ozone, maintain color and integrity during outdoor aging, and have a long fatigue life.

9 Claims, No Drawings

4,684,420

POLYMER TRANSFER DECALS COMPRISING SATURATED ELASTOMERS

TECHNICAL FIELD

The invention herein resides in the art of pneumatic vehicle tires and, more particularly, to such tires having a decorative applique adhered to the sidewall thereof during the curing process. Specifically, the invention relates to polymeric paints for generating such appliques.

BACKGROUND OF THE INVENTION

Heretofore, pneumatic tires having decorative sidewalls have been well received in the market. Previously, bands and other decorative features were applied to the sidewall by means of the vulcanization thereto of a complex extrudate during the curing process. Such techniques were not only expensive to implement, but were given to significant waste during the manufacturing process.

Copending patent application Serial No. 766,227, filed of even date herewith and assigned to The Firestone Tire & Rubber Company, assignee of the instant invention, presents a decorative sidewall for a pneumatic tire which is a significant departure from the prior art. According to this copending application, a polymeric paint or film is applied to selected portions of a release substrate to form a decal which is in turn placed into a tire mold. The mold is closed and the polymeric paint is brought into contact with the tire. During the curing operation, the polymeric paint decal is bonded to the tire. When the substrate is removed, the tire is left with a bonded decorative applique attached to the sidewall thereof. Typically, the applique has a thickness on the order of 0.003 inch.

In light of the concept of this copending patent application, there is a need for various compositions of paint or film which may be used to form the decals. Such paints must be crack resistant in flexing, must not degrade with aging, and must have good fatigue life. Commercial inks which might be used for generating decals for transfer to rubber are typically not resistant to ultraviolet light, ozone, or outdoor aging. Accordingly, applicants have devised new formulations to achieve such results.

DISCLOSURE OF THE INVENTION

In light of the foregoing, it is a first aspect of the invention to present a polymeric paint for transfer decals which is resistant to ultraviolet light.

Another aspect of the invention is the provision of a polymeric paint for transfer decals which is resistant to ozone.

Still another aspect of the invention is the provision of a polymeric paint which maintains its color and integrity during outdoor aging.

Yet an additional aspect of the invention is the provision of a polymeric paint for transfer decals which has a long fatigue life.

The foregoing and other aspects of the invention which will become apparent as the detailed description proceeds are achieved by: a paint composition having high resistance to ultraviolet light and ozone and suitable for generating appliques for adherence to tire sidewalls, said composition comprising: a saturated elastomer having a glass transition temperature not higher than about $-40$ degrees C.; a pigment, the amount of said pigment being in the range of about 0.5 to about 10 times the weight of said elastomer; and solvent.

BEST MODE FOR CARRYING OUT THE INVENTION

Applicants have found that suitable paints may be developed from saturated polymers. The saturated polymer is an uncured elastomer having a glass transition temperature $T_g$ not higher than about $-40$ degrees C. and preferably not higher than about $-45$ degrees C. Suitable polymers include hydrogenated styrene-butadiene-styrene block copolymers, hydrogenated styrene-isoprene-styrene block copolymers Hypalon, silicones, butyl, bromobutyl, chlorobutyl, urethanes, flurocarbons, and the like.

Titanium dioxide is the preferred pigment. Other pigments, especially other white pigments such as zinc oxide and zinc stearate, can also be used. A colored pigment is selected when a colored tire sidewall is desired. Two or more pigments, e.g., a combination of titanium dioxide and zinc oxide, can also be used. The pigment (or combination of pigments) imparts hiding power and stability against ultraviolet light to the composition.

The solvent is an aromatic hydrocarbon.

Additional ingredients, e.g., surfactants, antioxidants, antiozonants, etc., may be added but are not required. Compositions of this invention have satisfactory oxygen and ozone resistance without additional ingredients.

The amount of pigment is from about 0.5 to 10 times the weight of polymer, i.e., from about 50 to 1000 parts of pigment per 100 parts of polymer, all parts being expressed by weight. The amount of pigment depends on the degree of hiding power desired. When the pigment is titanium dioxide, the amount of titanium dioxide is from about 0.5 to about 5 times typically about 4 times, the weight of polymer. Decals made from these types of materials do not degrade upon outdoor aging or accelerated indoor tests. The materials also demonstrate a good fatigue life.

By way of example, applicants have found that a suitable master batch of paint may be formulated using Kraton G, a copolymer of styrene, ethylene, butalene, styrene produced by Shell Chemical; titanium dioxide, and a suitable solvent such as Solvent G, an aromatic hydrocarbon produced by Union Chemical, having a flash point of 140 degrees F. A master batch was produced by combining 40 parts Kraton G, 100 parts solvent, and 160 parts titanium dioxide, the titanium dioxide being added for color or hiding. The resulting composition was found to have a viscosity of approximately 40,000 centipoise, and was found to be 13.3% Kraton G, 33.3% solvent, and 53.3% titanium dioxide.

The master batch as above was then diluted to a desired viscosity depending upon the method of application, such as spraying, screening, or brushing. For such applications, sufficient solvent was added to bring the resultant mixture to a viscosity of 1500-3000 centipoise.

In generating the master batch, the polymer and solvent were first mixed together, with the titanium dioxide being added last. In the mix of polymer and solvent, the polymer content was preferably 10-40% regardless of the type of saturated polymer used. Titanium dioxide would then be added such that the titanium dioxide concentration would typically be 4 times that of the polymer concentration. It was found that the titanium dioxide concentration would preferably lie within a range of 0.5–5 times the polymer concentration, but 4 times such concentration was generally found to be the rule.

The example for Kraton G set forth above holds true for the saturated polymers earlier listed. However, applicants have found that when chlorobutyl is used as the polymer base, 5 parts of zinc oxide should also be added to provide for cross linking upon cure.

Applicants have also found that certain ionic monomers may be used as the base for the decal paint or film. One such embodiment has used ethylene propylene diene monomer (EPDM) as the base. EPDM is commercially available from Uniroyal as the zinc sulfonate of ethylene-propylene-diene rubber, as described in Uniroyal Product Bulletin No. IE2590. A master batch of paint was made by combining 8.68 parts of the monomer with 90.6 parts of the solvent and 20 parts of titanium dioxide. In this embodiment, the solvent consisted of 45 parts of Solvent G, 45 parts of aromatic naphta, 0.3 parts tributyl amine, and 0.3 parts n-butanol. The tributyl amine and n-butanol were added as ionalyzers. Of course, other ionic elastomers or ionomers may be used in substitution with the EPDM. It will further be understood that the master batch would typically be diluted with solvent to a desired viscosity dependent upon the method of application.

It has been found that paints made according to the foregoing formulations are quite suiting able for application to a substrate by any of various methods for purposes of forming a decal. Brushing, screening, or spraying of the paints so made may readily be achieved, the viscosity of the paint being established to be conducive with the method of application. The solvent evaporates leaving a film or decal on the substrate. This decal is transferred to the tire by conventional means. It has been found that decals made with these paints readily bond to a tire when held in intimate contact with the tire during the curing operation. The application of heat and pressure to the decal and tire achieve the desired transfer and bonding.

Films according to this invention have a modulus of about 2.5 MPa to about 10 MPa at 5.

It has been found that paints made according to the foregoing demonstrate an excellent fatigue life. In one test, one half inch wide strips coated with paints made according to the invention were cycled in an MTS flex tester at 5 HZ and a 15% strain. The strips were cycled 100,000 times at room temperature (about 20 degrees–25 degrees C.). None of the paints as set forth above have been found to fail under such tests, but commercial urethane, for example, has been found to crack at 30,000–40,000 cycles at room temperature. In similar flex tests conducted at −40 degrees C., strips of paints according to this invention cycled about 80,000 times before cracking versus about 2,000 cycles for commercial urethane.

Paints made according to the invention have also been statically tested for durability. The paints have been used to cover a substrate and left to weather in the ambient, demonstrating no adverse affects from the elements.

Paints of this invention have high oxygen and ozone resistance without the use of antioxidants and antiozonants. This is important because the best antioxidants and antiozonants in general cause staining, while the non-staining antioxidants and antiozonants tend to be less efficient.

Thus it can be seen that the objects of the invention are satisfied by the compositions presented hereinabove. While in accordance with the patent statutes only the best mode and preferred embodiments of the invention have been presented and described in detail, it is to be understood that the invention is not limited thereto or thereby. Accordingly, for an appreciation of the true scope and breadth of the invention reference should be had to the following claims.

What is claimed is:

1. A transfer decal having high resistance to ultraviolet light and ozone and having adherence to tire sidewalls, said decal comprising:
   (a) a saturated elastomer having a glass transition temperature not higher than about −40 degrees C.;
   (b) a pigment, the amount of said pigment being in the range of about 0.5 to about 10 times the weight of said elastomer, said decal being essentially devoid of unsaturation and free of staining and antiozonants, and forming a film having a flexural durability of at least about 100,000 cycles at room temperature and at least about 80,000 cycles at −40° C. when flexed at 5 Hz and a 15 percent strain.

2. A decal according to claim 1 wherein said pigment is a white pigment.

3. A decal according to claim 2 wherein said pigment is titanium dioxide.

4. A decal according to claim 3 wherein the amount of said pigment is from about 0.5 to about 5 times the weight of said elastomer.

5. A decal according to claim 1 in which said saturated elastomer is a thermoplastic elastomer of one or more hydrocarbon monomers.

6. A decal according to claim 1 in which said elastomer is a block copolymer.

7. A decal according to claim 1 wherein said saturated elastomer is ionic.

8. A process for preparing a decorative applique for a tire sidewall which comprises:
   (a) forming a decal according to claim 1,
   (b) transferring said decal to the sidewall of a tire, and
   (c) curing said tire.

9. A decal according to claim 1 in which said pigment is colored.

* * * * *